Patented Apr. 29, 1930

1,756,575

UNITED STATES PATENT OFFICE

ALBERT VERLEY, OF ISLE ST. DENIS, FRANCE

METHOD FOR SUBSTITUTING ALKYL GROUPS IN THE AROMATIC NUCLEUS

No Drawing. Application filed July 7, 1927, Serial No. 204,141, and in France March 31, 1927.

The reaction of Friedel and Crafts is, with the exception of some particular cases, the only general and reliable method of substituting the alkyl group in the aromatic nucleus.

The method which forms the subject-matter of the present invention renders the substitution of the said groups possible by using the alcohols as such, without it being necessary to resort to the halogen derivatives of the said alcohols, as is required by the reaction of Friedel and Crafts.

Moreover, while the reaction of Friedel and Crafts is applicable to little else than hydrocarbons and phenol ethers that of the present invention extends to a great number of other cases, and is, in particular, eminently suitable for the preparation of substituted aromatic acids.

The principles on which the reaction of the present invention is based are as follows:—

It is known that the sulphonation of the aromatic nucleus may be effected either by means of fuming sulphuric acid or by ordinary sulphuric acid.

In the first case the reaction is (1)  $C_6H_6 + OH-SO_2-O-SO_2-OH =$
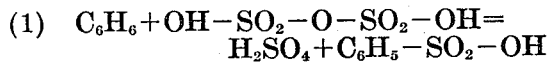

where $C_6H_6$ merely designates an aromatic nucleus.

Here pyrosulphuric acid comes into action and sulphuric monohydrate is eliminated.

In the second case the reaction is written (2)  $C_6H_6 + OH-SO_2-OH =$
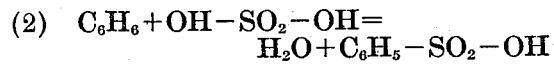

In this case it is sulphuric acid monohydrate which reacts and water which is eliminated.

Reaction 1 is far more vigorous than reaction 2, and on sulphonating by means of fuming sulphuric acid, reaction 1 takes place first, while reaction 2 does not begin until reaction 1 is completed, that is to say, when all pyrosulphuric acid has disappeared.

Reaction 2 is called the reaction of the "second degree" with reference to reaction 1.

Thirty years ago the inventor found (Verley, Bull., Soc. Ch. 3 39.72) that a mixture of benzene or toluene and isobutyl alcohol dissolved in fuming sulphuric acid yielded, on vigorous agitation, tertiary butyl benzene or butyl toluene. The inventor then attempted to extend the last mentioned reaction to other alcohols and aromatic hydrocarbons, and he has observed that this method of substitution is of a very general character and may be written (3)  $C_6H_6 + R-O-SO_2-OH =$
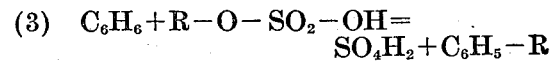

where R represents any alkyl group or radical, and where $C_6H_6$ may be replaced by any aromatic nucleus. However, under the conditions in which the reaction is carried out (i. e. using fuming sulphuric acid), a great loss of hydrocarbons is entailed by sulphonation; reaction 1 thus takes place at the same time as reaction 3.

Reaction 3 is therefore of the same order as reaction 1, and this led the inventor to conclude that in order to produce reaction 3 exclusively it is necessary that the alkyl-sulphuric acid be dissolved in sulphuric acid monohydrate free from pyrosulphuric acid.

In the latter case sulphonation can take place only with difficulty, because the said sulphonating reaction is due to sulphuric acid monohydrate and is of the second degree compared with reaction 3, which is of the same order as reaction 1.

In order to produce in actual practice the mixture consisting of $R-O-SO_2-OH$ and of sulphuric acid free of pyro-sulphuric acid, the following steps are taken:—

25 parts of potassium pyrosulphate $(S_2O_7K_2)$ or sodium pyrosulphate $(S_2O_7Na_2)$ are dissolved with heat in 75 parts of commerical 66° sulphuric acid. The resulting mixture, which becomes pasty on cooling, does not contain any free pyrosulphuric acid, it does not fume in the air and behaves as a sulphonating agent in the same way as sulphuric acid monohydrate (sulphonation of the second degree). If any alcohol (primary, secondary or tertiary) is added to the sulphuric mixture of pyrosulphate, sulphuric acid ether is formed and water which is eliminated reacts with the pyrosulphate producing bisulphate, according to the reaction:—

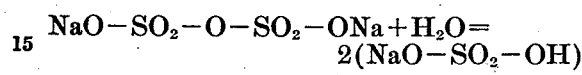

$$NaO-SO_2-O-SO_2-ONa+H_2O= 2(NaO-SO_2-OH)$$

This mixture when brought in contact, in the agitator, with the benzene nucleus in which substitution is to be carried out, reacts readily at temperatures varying between 30° and 80° C. without appreciable sulphonation of the said nucleus. This reaction is quite general and takes place in almost all cases where actual sulphonation is possible, for example with hydrocarbons, halogen substituted hydrocarbons, phenol esters, ethers, aromatic acids, etc.

The rule governing the position of the substituted alkyl group is the same as the one governing the substitution of other groups, particularly the sulphonic group.

With phenylacetic acid, for example, para substitution occurs, while with benzoic acid, substitution in the meta position is effected. As regards the free phenols, they are readily sulphonated by ordinary sulphuric acid and substitutions cannot be carried out except under certain conditions, for example by using a previously prepared monosulphonated derivative of phenol.

For example by causing the mixture consisting of sulphuric acid and pyrosulphate to which methyl alcohol has been added, to act on phenol parasulphonic acid (1)$OH-C_6H_5-SO_2-OH$(4), substitution of the methyl group takes place in the ortho position relatively to the OH group; the sulphonic group is then removed by means of superheated steam and orthocresol is collected.

By using meta-cresol and isopropyl alcohol the same reaction yields thymol in crystalline form.

EXAMPLE 1

*Preparation of para-cymene from toluene*

100 kgs. of a mixture consisting of sulphuric acid containing 25% of sodium pyrosulphate are placed in an agitator together with 5 kgs. of iso-propyl alcohol and
25 kgs. of toluene.

The agitator is set in motion, the material is allowed to rise in temperature to about 60° C. at which it is maintained for one hour. The said material is then treated with water and the supernatant layer drawn off. The said layer is washed and is separated into toluene and pure para-cymene by fractionation.

EXAMPLE 2

*Preparation of meta-toluic acid from benzoic acid*

100 kgs of a mixture consisting of sulphuric pyrosulphate are placed in an agitator together with 4,5 kgs. of methyl alcohol and
5 kgs. of benzoic acid.

The agitator is set in motion and the material maintained at 70° C. during three to four hours. The reaction product treated with water at the end of that time yields a layer consisting of a mixture of metatoluic acid and the methyl ester of the same acid, which is separated and extracted by known methods.

Having thus described my invention what I claim as new and desire to secure by Letters Patent is—

1. A method of obtaining a substituted aromatic derivative by the substitution of an alkyl radical for hydrogen in an aromatic nucleus, the said method consisting in allowing an alykl sulphuric acid to react with an aromatic hydrocarbon containing the said nucleus in presence of an alkali metal pyrosulphate.

2. A method of obtaining a substituted aromatic derivative by the substitution of an alkyl radical for hydrogen in an aromatic nucleus, the said method consisting in agitating an aromatic hydrocarbon containing the said nucleus with an alcohol, sulphuric acid monohydrate, and alkali metal pyrosulphate.

In testimony, that I claim the foregoing as my invention, I have signed my name this 17th day of May, 1927.

ALBERT VERLEY.